(12) United States Patent
Francois et al.

(10) Patent No.: US 10,449,806 B2
(45) Date of Patent: Oct. 22, 2019

(54) TREAD LAYER FOR AN AIRCRAFT TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Olivier Francois, Clermont-Ferrand (FR); Antoine Canzi, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 311 days.

(21) Appl. No.: 15/517,880

(22) PCT Filed: Oct. 7, 2015

(86) PCT No.: PCT/EP2015/073101
§ 371 (c)(1),
(2) Date: Apr. 7, 2017

(87) PCT Pub. No.: WO2016/055504
PCT Pub. Date: Apr. 14, 2016

(65) Prior Publication Data
US 2017/0313134 A1    Nov. 2, 2017

(30) Foreign Application Priority Data
Oct. 9, 2014   (FR) ...................................... 14 59664

(51) Int. Cl.
*B60C 11/117*    (2006.01)
*B60C 11/01*    (2006.01)
*B60C 11/03*    (2006.01)

(52) U.S. Cl.
CPC ............ *B60C 11/01* (2013.01); *B60C 11/032* (2013.01); *B60C 11/0306* (2013.01);
(Continued)

(58) Field of Classification Search
CPC ..................... B60C 11/032; B60C 2011/0381
See application file for complete search history.

(56) References Cited

U.S. PATENT DOCUMENTS 3,409,064 A * 11/1968 Leonard ............... B60C 11/0306
152/209.17
3,543,827 A * 12/1970 Holmes ................. B60C 11/032
152/209.17
(Continued)

FOREIGN PATENT DOCUMENTS

KR    2004-0038994 A   *   5/2004
WO    WO 2010/012913    2/2010
(Continued)

OTHER PUBLICATIONS

Machine translation for Korea 2004-0038994 (Year: 2019).*
Derwent Abstract for Korea 2004-0038994 (Year: 2019).*

*Primary Examiner* — Steven D Maki
(74) *Attorney, Agent, or Firm* — Cozen O'Connor

(57) ABSTRACT

A tire for an aeroplane with the tread (2) comprising two shoulder ribs (6) having an axial width $L_S$, each shoulder rib (6) comprises cavities (8) that open onto the tread surface (3), forming an opening surface (81) inscribed in a circle of diameter D. These cavities (8) are distributed circumferentially at a circumferential spacing P and along a periodic curve (9) having a period T and an amplitude A. The circumferential spacing P between two consecutive cavities (8) is at most equal to 0.2 times the period T of the periodic curve (9), the period T of the periodic curve (9) is at most equal to the circumferential length $L_C$ of the contact patch (Continued)

(31), and the amplitude A of the periodic curve (9) is at most equal to 0.5 times the axial width $L_S$ of the shoulder rib (6).

9 Claims, 4 Drawing Sheets

(52) U.S. Cl.
CPC ... *B60C 11/0332* (2013.01); *B60C 2011/0381* (2013.01); *B60C 2200/02* (2013.01)

(56) References Cited

U.S. PATENT DOCUMENTS

| | | |
|---|---|---|
| 7,669,798 B2 | 3/2010 | Guering et al. |
| 2014/0326383 A1* | 11/2014 | Chambriard ............ B60C 11/03 152/209.18 |
| 2014/0367013 A1* | 12/2014 | Chambriard ............ B60C 11/04 152/209.18 |

FOREIGN PATENT DOCUMENTS

| | | |
|---|---|---|
| WO | WO 2010/052447 | 5/2010 |
| WO | WO 2013/092578 | 6/2013 |
| WO | WO 2013/092581 | 6/2013 |
| WO | WO-2013/092581 A1 * | 6/2013 |
| WO | WO 2013/092585 | 6/2013 |
| WO | WO-2013/092585 A1 * | 6/2013 |

* cited by examiner

TREAD LAYER FOR AN AIRCRAFT TIRE

RELATED APPLICATIONS

This is a U.S. National Phase Application under 35 USC 371 of International Application PCT/EP2015/073101 filed on Oct. 7, 2015.

This application claims the priority of French application no. 1459664 filed Oct. 9, 2014, the entire content of which is hereby incorporated by reference.

FIELD OF THE INVENTION

The present invention relates to a tire for an aeroplane and, in particular, to the tread of an aeroplane tire.

BACKGROUND OF THE INVENTION

As a tire has a geometry that exhibits symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. The expressions "radially", "axially" and "circumferentially" mean "in the radial direction", "in the axial direction" and "in the circumferential direction", respectively.

In general, a tire comprises a crown comprising a tread intended to come into contact with the ground via a tread surface, said crown being connected by two sidewalls to two beads intended to come into contact with a rim.

The tread is intended to come into contact with the ground via a tread surface over a contact patch of circumferential length $L_C$ and axial width $L_A$, which depends on the mechanical stresses of load and pressure that are applied to the tire. In the case of an aeroplane tire, it is usual to define the contact patch when the tire in the new state is inflated to its recommended nominal pressure and is subjected to a radial deflection equal to 32%. By definition, the circumferential length $L_C$ and the axial width $L_A$ of the contact patch are the circumferential length and the axial width, respectively, of the rectangle in which the contact patch, of more or less elliptical shape, is inscribed. The contact patch is the footprint of the tire when the tire in the new state is subjected to a radial deflection equal to 32% under the combined action of the vertical load and the inflation pressure. By definition, the radial deflection of a tire is its radial deformation, or relative variation in radial height, when the tire passes from an unladen inflated state to a statically loaded inflated state. It is defined by the ratio of the variation in radial height of the tire to half the difference between the outside diameter of the tire and the maximum diameter of the rim measured on the rim flange. The outside diameter of the tire is measured under static conditions in an unladen state inflated to the nominal pressure as recommended, for example, by the Tire and Rim Association or TRA.

The tread is a torus-shaped volume extending radially from a bottom surface to the tread surface over a radial height H, extending axially from a first tread edge to a second tread edge, and extending circumferentially around the entire periphery of the tire having a circumferential length C. The tread made of elastomeric material is the wearing portion of the tire. The bottom surface is a theoretical surface delimiting the maximum permissible degree of wear. When the level of wear reaches this bottom surface, it is recommended to withdraw the tire from service.

The tread is generally made up of raised elements extending radially outwards from the bottom surface, said raised elements being separated by voids. In the case of an aeroplane tire, the raised elements are usually circumferential ribs separated by circumferential voids referred to as circumferential grooves. A circumferential rib extends radially between the bottom surface and the tread surface, over a radial distance referred to as the radial height. It extends axially between two lateral faces, over an axial distance referred to as the axial width, the axial width being measured at the tread surface. Finally, it extends circumferentially and continuously over the entire periphery of the tire. By way of example, a tread of an aeroplane tire may comprise, symmetrically about the equatorial plane, passing through the middle of the tread and perpendicular to the axis of rotation, two axially external circumferential ribs or shoulder ribs, limited axially on the outside by one of the two edges of the tread and on the inside by a circumferential groove, two intermediate circumferential ribs and, at the centre of the tread, a central circumferential rib. A central or intermediate circumferential rib extends axially from a first circumferential groove to a second circumferential groove, while an axially external circumferential rib or shoulder rib extends axially from an edge of the tread to a circumferential groove. Thus, a tread comprises at least two shoulder ribs, each extending axially from a tread edge to a circumferential groove over an axial width $L_S$.

Positioned radially on the inside of the tread is the crown reinforcement, which is the tire crown reinforcing structure. The crown reinforcement of an aeroplane tire generally comprises at least one crown reinforcing layer referred to as the crown layer. Each crown layer is made up of reinforcing elements coated in an elastomeric material, i.e. one based on natural or synthetic rubber, said mutually parallel reinforcing elements making an angle of between +20° and −20° with the circumferential direction. In an aeroplane tire, the reinforcing elements of a crown layer are generally arranged circumferentially in an undulating curve.

Among the crown layers, a distinction is made between the working layers that constitute the working reinforcement, usually comprising textile reinforcing elements, and the protective layers that constitute the protective reinforcement, usually comprising metal or textile reinforcing elements, and are arranged radially on the outside of the working reinforcement. The working layers govern the mechanical behaviour of the crown. The reinforcing elements of the working layers are usually cords made up of spun textile filaments, preferably made of aliphatic polyamides or of aromatic polyamides. The protective layers essentially protect the working layers from attack likely to spread through the tread radially towards the inside of the tire. The reinforcing elements of the protective layers may be either cords made up of metal threads or cords made up of spun textile filaments.

Aeroplane manufacturers are constantly concerned with passenger safety and, therefore, with reducing the risks of failure of their craft. Among potential failure modes, the partial or complete loss of the tread of a tire with which an aeroplane landing gear is equipped is a critical failure mode that occurs during aeroplane takeoff or landing phases.

This failure mode occurs, in particular, when the tire runs over a blunt object that might be present by chance on the runway. Bearing in mind the harsh conditions of use of an aeroplane tire, which are characterized by a high inflation pressure, a high static load, a high dynamic load and a high speed, the tread of the tire running over the blunt object causes damage to the tread, this generally resulting in the cutting of the tread and then in pieces of tread of varying geometric dimensions and mass being thrown up.

The pieces of tread may then either strike the structures of the aeroplane and lead to significant structural damage because of the mechanical energy stored up by said pieces, with this mechanical energy being higher, the higher the mass and speed at which the pieces are thrown up, or may enter the aeroplane engines and lead to problems with the operation of said engines, if these engines are unable to absorb the pieces of tread because they are too great in size.

Reinforcing the structures of the aeroplane in order to withstand potential impacts, particularly those of pieces of tread, has been considered. However, for the same materials, this solution entails increasing the mass of the structure, something which is detrimental as far as aeroplane performance is concerned, which is why increasingly lightweight structural materials are being used. Mechanically strengthening the structure does not, however, solve the problem of pieces being thrown into the engines.

Devices affording protection against pieces of tread being thrown up have also been considered. The document WO 2010012913 describes a protective panel, the external surface of which comprises a composite material, and which is mounted, via deformable components, on a support connected to the structure of the aeroplane. The deformable components, which are fixed to several support stiffening components and are perpendicular to the external surface of the protective panel, are designed to buckle under the effect of impacts by thrown up pieces of tread. The document WO 2010052447 describes a device that protects the engines of an aeroplane from thrown up tire tread debris. This device comprises a protective bar connected in a pivoting manner to the aeroplane main landing gear, the protective bar being able to move between a first and a second position. In the first position, the protective bar extends laterally across the mounted assembly consisting of the tire and of a wheel, in order to intercept possible paths of tread debris.

Devices for breaking up the tread with a view to minimizing the size of the pieces of tread and therefore to minimizing impacts with the aeroplane have also been described. The document U.S. Pat. No. 7,669,798 describes break-up means that are situated between the wheel and another part of the aeroplane and are able to break up into several pieces the bit of tread which has become detached from the tire and is being thrown up towards the other part of the aeroplane. These break-up means, such as a grating with blades that are able to cut up the material of the tread, are designed to disperse said pieces.

The above-described protective or break-up devices have the disadvantage of constituting additional structures, the additional masses of which are detrimental to the payload of the aeroplane.

Devices for breaking up the tread that are incorporated into the tire have also been proposed. The document WO 2013092578 describes an aeroplane tire comprising a tread-separation layer radially inside the tread and radially outside the crown reinforcement. The document WO 2013092581 describes an aeroplane tire, the tread of which comprises rows of cavities that open onto the tread, are parallel to one another, are inclined at an angle at least equal to 45° with respect to the circumferential direction of the tire and are distributed circumferentially over at least a part of the periphery of the tire. The document WO 2013092585 describes an aeroplane tire, the tread of which comprises independent cavities that are distributed axially over at least a part of the axial width of the tread and are distributed circumferentially over at least a part of the periphery of the tire.

When the tread is attacked by a blunt object, more particularly at a shoulder rib, accidental tread separation is limited to this shoulder rib. In this case, the shoulder rib is often cut in the form of a strip, a part of which remains integral with the tire and the free part of which is likely to strike the structure of the aeroplane on each revolution of the wheel.

SUMMARY OF THE INVENTION

One object of the present invention is to ensure that a shoulder rib of an aeroplane tire, which is subjected to accidental tread separation resulting from the spread of a crack initiated by external attack, is cut in the form of pieces of tread, the size and mass of which will not damage the structure or the engines of the aeroplane. It aims to provide a device incorporated into the tire and not an additional device outside the tire, which would be detrimental to the payload of the aeroplane.

This objective has been achieved, according to one aspect of the invention, directed to a tire for an aeroplane, comprising:

a tread intended to come into contact with the ground via a tread surface over a contact patch of circumferential length $L_C$ and axial width $L_A$ when the tire inflated to its recommended nominal pressure is subjected to a radial deflection equal to 32%, the tread extending radially from a bottom surface to the tread surface over a radial height H, extending axially from a first tread edge to a second tread edge, and extending circumferentially around the entire periphery of the tire, the tread comprising two axially external circumferential ribs referred to as shoulder ribs, each extending axially from a tread edge to a circumferential groove over an axial width $L_S$, each shoulder rib comprising cavities that open onto the tread surface, forming an opening surface inscribed in a circle of diameter D, the cavities of each shoulder rib being distributed circumferentially at a circumferential spacing P, the cavities of each shoulder rib being positioned circumferentially along a periodic curve having a period T and an amplitude A, the circumferential spacing P between two consecutive cavities being at most equal to 0.2 times the period T of the periodic curve, the period T of the periodic curve being at most equal to the circumferential length $L_C$ of the contact patch, and the amplitude A of the periodic curve being at most equal to 0.5 times the axial width $L_S$ of the shoulder rib.

According to the invention, each shoulder rib comprises cavities that open onto the tread surface, forming an opening surface inscribed in a circle of diameter D. In other words, the opening surface is not necessarily circular, but has to be inscribed in a circle of diameter D. Therefore, these cavities form holes or wells in each of the two shoulder ribs, i.e. in the elastomeric compound of which the shoulder rib is made.

A cavity, within the meaning of the invention, is not a sipe, as used for example on the edges of the circumferential ribs of a tire for a heavy goods vehicle in order to combat irregular tire wear, these sipes generally having a small circumferential spacing of the order of a few millimeters. Neither, within the meaning of the invention, is a cavity a transverse cut in the tread aimed at improving the traction of a tire for the driven axle of a heavy goods vehicle or for improving the engagement of the tread with ground of the construction site or field type in the case of a tire for a construction plant vehicle or agricultural vehicle. A cavity, within the meaning of the invention, is an area of local weakening of the tread making the tread easier to cut at this cavity.

For a given shoulder rib, the cavities are, for the one part, distributed circumferentially at a circumferential spacing P, which is preferably but not necessarily constant, and, for the other part, positioned circumferentially along a periodic curve having a period T and an amplitude A. In order to solve the technical problem addressed, namely that of helping to reduce the dimensions and thus the mass of the pieces of tread in the event of accidental tread separation, the geometric features P, T and A should meet a number of conditions. First of all, the circumferential spacing P between two consecutive cavities should be at most equal to 0.2 times the period T of the periodic curve. Next, the period T of the periodic curve should be at most equal to the circumferential length $L_C$ of the contact patch. Finally, the amplitude A of the periodic curve should be at most equal to 0.6 times the axial width $L_S$ of the shoulder rib.

The inventors have found that all points of a shoulder rib describe a period of curvilinear path on passing through the contact patch, on account of the both axial and circumferential flattening of the shoulder rib. Consequently, any crack initiated in a shoulder rib, for example following the running of the tire over a blunt object, will tend to spread naturally along such a periodic path. The cavities according to the invention are thus distributed on such a periodic path, at a given spacing, so as to encourage natural cracking if the shoulder rib is damaged.

A circumferential spacing P between two consecutive cavities, at most equal to 0.2 times the period T of the periodic curve, allows a crack initiated by damage to spread between two consecutive cavities without initiating spontaneous cracking. The circumferential spacing is the circumferential distance between two consecutive rows of cavities, it being possible for this circumferential spacing to be constant or variable over the periphery of the tire. The circumferential length of the periphery of the tire is the developed length of the tread surface and can be measured on the tire in the new state, not mounted on the rim and uninflated, using, for example, a tape measure.

A period T of the periodic curve that is at most equal to the circumferential length $L_C$ of the contact patch makes it possible to have at least one pattern, corresponding to a period, in the contact patch, thereby ensuring that the initiated crack spreads on each revolution of the wheel and that the circumferential length of the pieces of shoulder rib is limited in the event of tread separation.

Finally, an amplitude of the periodic curve that is at least equal to 0.6 times the axial width $L_S$ of the shoulder rib allows the shoulder rib to be cut fully over its entire axial width $L_S$. This also avoids the creation of a strip of shoulder rib, said strip remaining integral with the tread of the tire and being likely to strike the aeroplane on each revolution of the wheel.

Advantageously, the circumferential spacing P between two consecutive cavities is at least equal to twice the diameter D of the opening surface of a cavity. A minimum spacing makes it possible to control the spread of the crack in the event of cracking without impairing the other performance factors, such as wear and grip.

Also advantageously, the diameter D of the opening surface of a cavity is at least equal to 2 mm, preferably at least equal to 5 mm. This is because the diameter D of the opening surface of a cavity has to be sufficient so as not to close under the effect of rolling.

Each cavity is preferably a cylinder having a radial height $H_C$. Because of the absence of sharp edges, a cylindrical cavity shape avoids the initiation of cracks at the cavities under normal conditions of use.

Also preferably, the radial height $H_C$ of each cavity is at most equal to the radial height H of the tread. This makes it possible to limit the spread of the crack to the tread, without reaching the crown reinforcement, and thus to limit tread separation to the shoulder rib.

The periodic curve is preferably a broken line, which is the most simple periodic curve shape.

According to a preferred embodiment, when the tread comprises at least one axially internal circumferential rib, i.e. axially inside the two shoulder ribs, said axially internal circumferential rib extending axially from a first circumferential groove to a second circumferential groove, each shoulder rib comprises groove-edge cavities that open onto the tread surface and onto the circumferential groove adjacent to the shoulder rib, the at least one axially internal circumferential rib comprises groove-edge cavities that open onto the tread surface and onto each of the circumferential grooves adjacent to the axially internal rib, the groove-edge cavities formed in the shoulder ribs and in the at least one axially internal circumferential rib form mutually parallel rows of cavities that are inclined at an angle at least equal to 45° with respect to the circumferential direction of the tire, and the rows of cavities are distributed circumferentially around at least a part of the periphery of the tire at a circumferential spacing at least equal to 0.02 times and at most equal to 0.12 times the circumferential length of the periphery of the tire.

This embodiment is advantageous for obtaining complete break-up of the tread, i.e. over its entire axial width, when a blunt object, like a blade, simultaneously cuts into the various circumferential ribs of the tread. Specifically, it combines a distribution of cavities in each shoulder rib, ensuring that the shoulder rib is broken up in the event of cracking, and rows of groove-edge cavities formed in the lateral edges of the axially internal circumferential ribs, ensuring that any axially internal circumferential rib is broken up. An axially internal circumferential rib can be either an intermediate rib, situated to one side of the equatorial plane of the tire, or a central rib, centred on the equatorial plane of the tire.

The axially internal edge of each shoulder rib and also the two edges of each axially internal circumferential rib comprise groove-edge cavities that form rows inclined at an angle at least equal to 45° with respect to the circumferential direction of the tire. The angle of inclination of the rows of cavities is thus closer to the axial direction than to the circumferential direction, thereby encouraging a movement of cyclic opening and closing of the cavities as they enter and then leave the contact patch. These cyclic openings and closings, on each revolution of the wheel, encourage the spread of cracks.

Moreover, the rows of cavities are distributed circumferentially at a circumferential spacing at least equal to 0.02 times and at most equal to 0.12 times the circumferential length of the periphery of the tire. This range of values for the circumferential spacing is defined according to the desired maximum circumferential length of the pieces of tread likely to become detached from the tire. Furthermore, the maximum circumferential spacing, equal to 0.12 times the circumferential length of the periphery of the tire, ensures that there will be at least one cavity per circumferential rib present in the contact patch.

The phenomenon of cracking of an axially internal circumferential rib is, according to the inventors, different from that relating to a shoulder rib. This is because, as it passes through the contact patch, a shoulder rib is subjected both to circumferential flexion and axial flexion, whereas an axially internal circumferential rib is mainly subjected to circumferential flexion. As a crack initiated in an axially internal circumferential rib enters the contact patch in which the tread surface is in contact with the ground, under the action of cyclic mechanical stresses on each revolution of the wheel, this crack spreads radially towards the inside of the tire as far as the radially outermost crown layer, then spreads axially and circumferentially along the radially outer face of the radially outermost crown layer, causing the crown of the tire to be cut at the radially outermost crown layer. Under the effect of mechanical stresses and, in particular, centrifugal forces, the crack will spread radially towards the outside of the tire through the tread, at various azimuths of the tire. As a result, the portion of tread thus cut out in the form of pieces of varying dimensions, or even practically the entire tread, will detach from the tire and be thrown outwards with the risk of striking the structure of the aeroplane or of entering the engines.

In the case of a conventional tread, i.e. one comprising only circumferential ribs separated by circumferential grooves but not comprising rows of cavities as defined in the present embodiment, the pieces of tread may extend axially over an axial portion or over the entire axial width of the tread. Circumferentially, the pieces of tread may extend over a large proportion of the periphery of the tire, or even over the entire periphery thereof. As a result, the pieces of tread thrown up have detrimental dimensions and masses that are likely to damage the structures or engines of the aeroplane.

In the case of a tread comprising rows of cavities, the pieces of tread have axial and circumferential dimensions that are smaller than in the case of a conventional tread.

This is because the cavities constitute regions of preferential cutting of the tread, in so far as they allow a local reduction in the radial thickness of the tread. This reduction in radial thickness leads to a hinge effect as the cavities enter and leave the contact patch in which the tread surface is in contact with the ground. It thus encourages the emergence of cracks spreading radially outwards from the radially outer face of the radially outermost crown layer. The mechanical stresses of alternately opening and closing the cavities as they pass through the contact patch on each revolution of the wheel encourage the cracks to spread and these cracks also open out more rapidly given the local reduction in radial thickness of the tread. In other words, the cavities constitute areas of local weakening encouraging the emergence of cracks and the cutting of the tread.

The rows of cavities also constitute planes of preferential cracking of the tread, thereby limiting the circumferential length of the pieces of tread. As a result, the circumferential length of a piece of tread should not theoretically exceed the circumferential distance or circumferential spacing between two consecutive rows of cavities. The choice of circumferential spacing thus governs the maximum circumferential length of the pieces of tread.

The presence of cavities in a circumferential rib causes said circumferential rib to be cut, allowing it therefore to come away from the tire independently of the adjacent ribs. The axial width of the pieces of tread is thus reduced to the axial width of the rib.

According to one variant of the above preferred embodiment, the rows of cavities are inclined at an angle at least equal to 80° with respect to the circumferential direction.

BRIEF DESCRIPTION OF THE DRAWINGS

The features and other advantages of the invention will be better understood with the aid of FIGS. 1 to 4.

In order to make the invention easier to understand, FIGS. 1 to 4 have not been drawn to scale but in a simplified manner

DETAILED DESCRIPTION OF THE DRAWINGS

Figure 1:
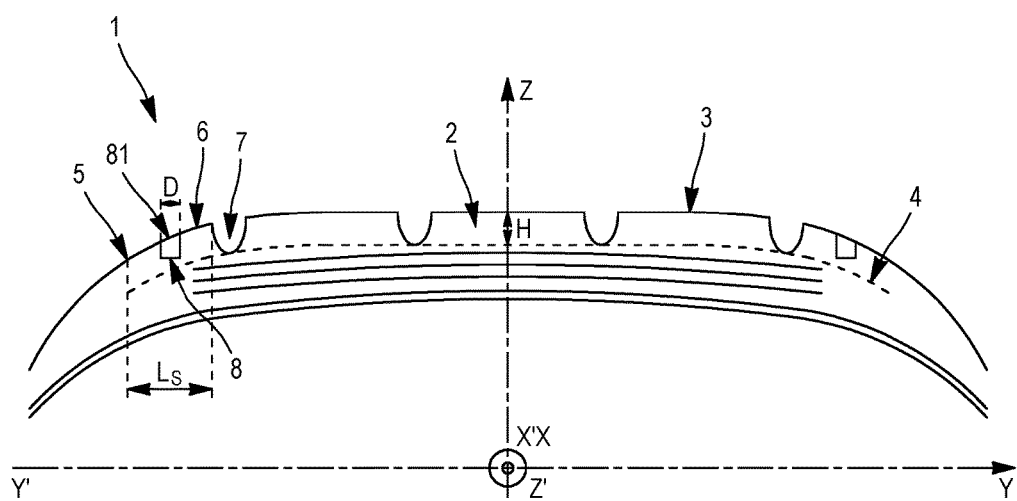
FIG. 1: a meridian section through the crown of an aeroplane tire according to an embodiment of the invention.

FIG. 1 shows a meridian section through the crown of an aeroplane tire 1 according to the invention, i.e. a section in a meridian plane (YY', ZZ'), in which the directions YY' and ZZ' are the axial and radial directions, respectively, of the tire. The tread 2, which is intended to come into contact with the ground via the tread surface 3, extends radially from the bottom surface 4 to the tread surface 3 over a radial height H, axially from a first tread edge to a second tread edge 5, and circumferentially around the entire periphery of the tire (not shown). In the example shown, the tread 2 comprises five circumferential ribs, including two axially external circumferential ribs referred to as shoulder ribs 6, each extending axially from a tread edge 5 to a circumferential groove 7 over an axial width $L_S$. Shown in section in each shoulder rib 6 is a cavity 8 of cylindrical shape that opens onto the tread surface 3 over a circular opening surface 81 of diameter D. Also shown are the crown reinforcement of the tire, made up of crown layers radially inside the bottom surface 4, and the carcass reinforcement radially inside the crown reinforcement.

Figure 2:
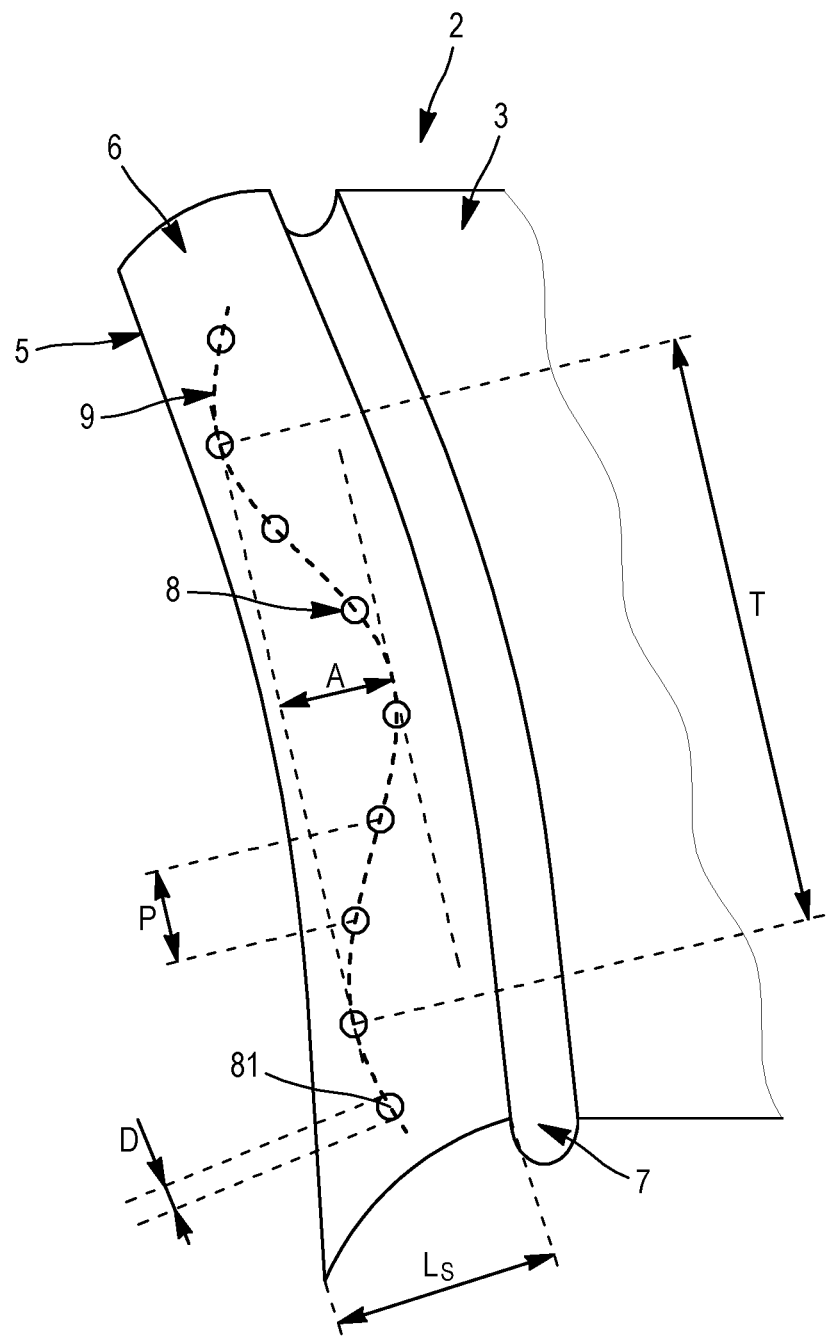
FIG. 2: a perspective view of a shoulder rib according to an embodiment of the invention.

FIG. 2 presents a perspective view of a shoulder rib 6 according to the invention. More specifically, it presents a shoulder portion of the tread 2, comprising a shoulder rib 6, a circumferential groove 7 and an intermediate circumferential rib. The shoulder rib 6 extends axially from a tread edge 5 to the circumferential groove 7 over an axial width $L_S$. The shoulder rib 6 comprises cavities 8 that open onto the tread surface 3, forming an opening surface 81 inscribed in a circle of diameter D. The cavities 8 are distributed circumferentially at a circumferential spacing P and positioned circumferentially along a periodic curve 9 having a period T and an amplitude A.

Figure 3:
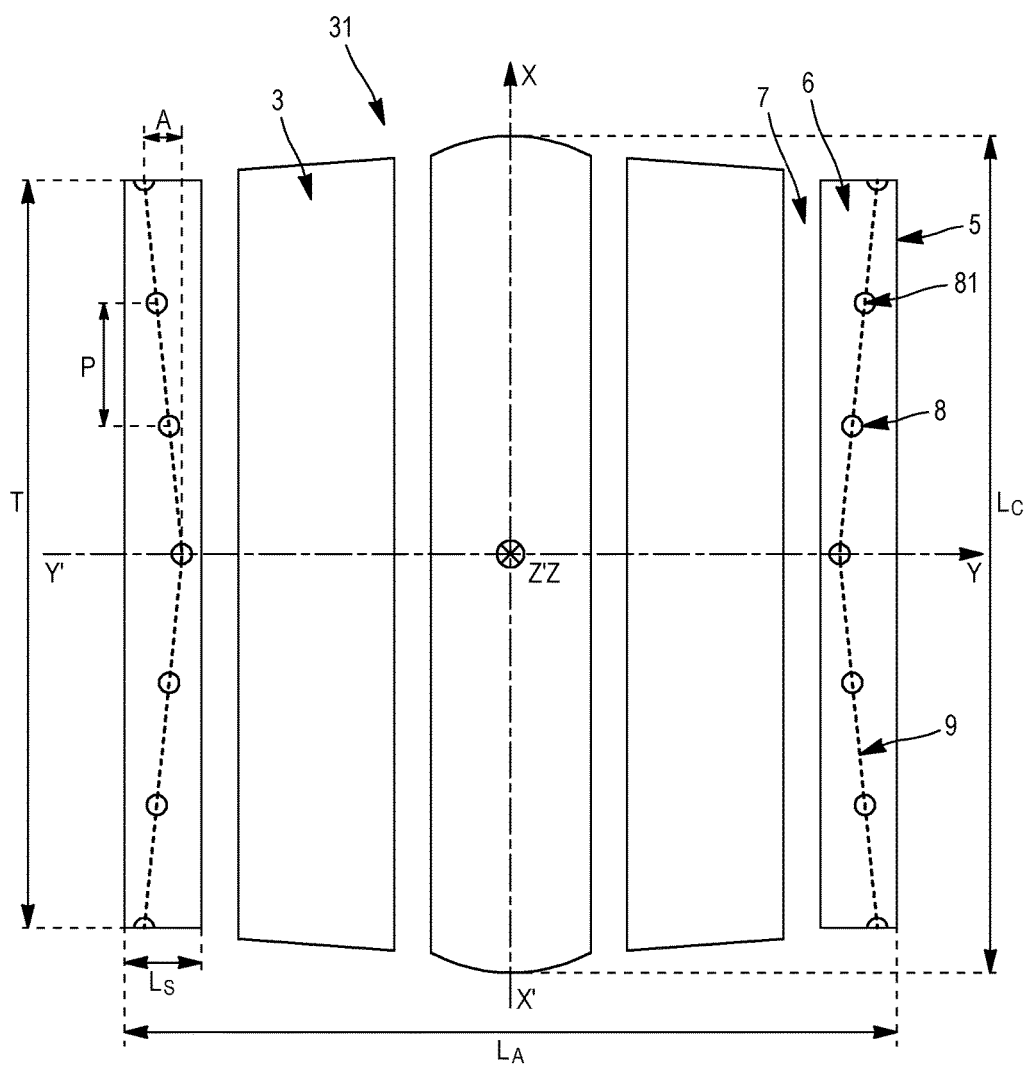
FIG. 3: contact patch of a tread of an aeroplane tire according to an embodiment of the invention.

FIG. 3 shows a contact patch 31 of a tread of an aeroplane tire according to the invention when the tire in the new state, inflated to its recommended nominal pressure pursuant to the TRA standard, is squashed under a load corresponding to a radial deflection of 32%. The contact patch, inscribed in a rectangle, is defined by its circumferential length $L_C$ and its axial width $L_A$. In the example shown, the shoulder rib 6, extending axially between the edge 5 of the tread and the circumferential groove 7 over an axial width $L_S$, comprises a distribution of cavities 8 that open onto the tread surface 3 over opening surfaces 81 of circular section of diameter D that are distributed at a spacing P approximately equal to 0.1 times the period T of the periodic curve. The curve 9, which bears the cavities 8, has a period T less than the circumferential length $L_S$ and an amplitude A approximately equal to 0.5 times the axial width $L_S$ of the shoulder rib 6.

Figure 4:
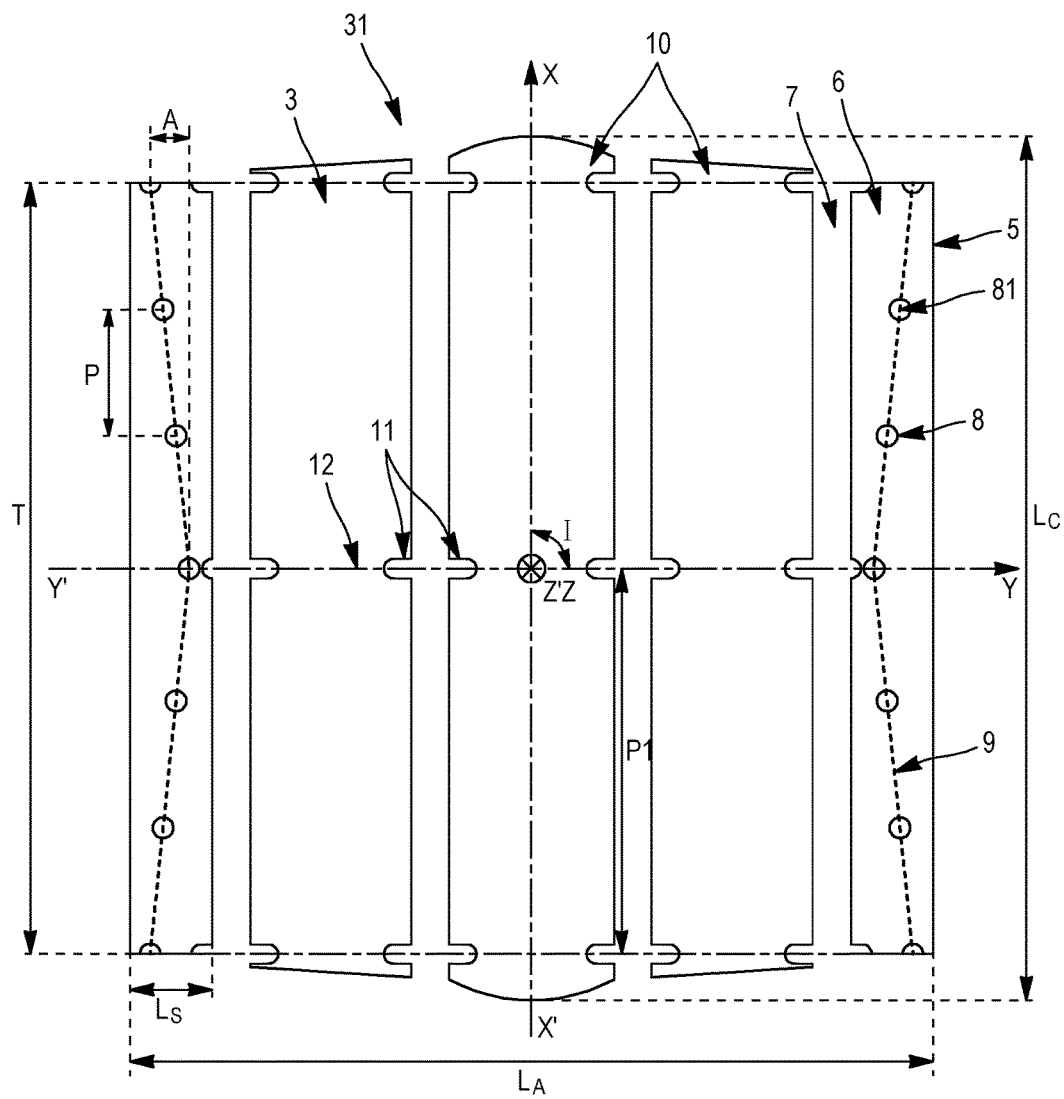
FIG. 4: contact patch of a tread of an aeroplane tire according to an embodiment of the invention, with rows of cavities.

FIG. 4 shows a contact patch 31 of a tread of an aeroplane tire according to a preferred embodiment when the tire in the new state, inflated to its recommended nominal pressure pursuant to the TRA standard, is squashed under a load corresponding to a radial deflection of 32%. The contact patch, inscribed in a rectangle, is defined by its circumferential length $L_C$ and its axial width $L_A$. In the example shown, each shoulder rib 6, extending axially between the edge 5 of the tread and the circumferential groove 7 over an axial width $L_S$, comprises a distribution of cavities 8 that open onto the tread surface 3 over opening surfaces 81 of circular section of diameter D that are distributed at a spacing P approximately equal to 0.1 times the period T of the periodic curve. The curve 9, which bears the cavities 8, has a period T less than the circumferential length $L_S$ and an amplitude A approximately equal to 0.5 times the axial width $L_S$ of the shoulder rib 6. Moreover, the tread comprises three axially internal circumferential ribs 10 that extend axially from a first circumferential groove 7 to a second circumferential groove 7, two intermediate ribs situated on either side of the equatorial plane XZ of the tire, and a central rib centred on the equatorial plane XZ of the tire. Each of the two shoulder ribs 6 comprises groove-edge cavities 11 that open onto the tread surface 3 and onto the circumferential groove 7 adjacent to the shoulder rib. Each of the three axially internal circumferential ribs 10 comprises groove-edge cavities 11 that open onto the tread surface 3 and onto each of the circumferential grooves 7 adjacent to the axially internal circumferential rib. The groove-edge cavities 11 formed in the two shoulder ribs 6 and in the three axially internal circumferential ribs form mutually parallel rows 12 of cavities that are inclined at an angle I equal to 90° with respect to the circumferential direction XX' of the tire. In the present case, the rows 12 of cavities are distributed circumferentially around the entire periphery of the tire, at a constant circumferential spacing P1 equal to 0.5 times the circumferential length $L_C$ of the contact patch of the tire.

The inventors carried out the invention for an aeroplane tire of size 46×17R20, the use of which is characterized by a nominal pressure equal to 15.3 bar, a nominal static load equal to 20 473 daN, and a maximum reference speed of 360 km/h.

In the tire studied, the tread comprises five circumferential ribs: 2 shoulder ribs, 2 intermediate ribs and a central rib with respective axial widths of 50 mm, 33.5 mm and 82 mm. Each of the two shoulder ribs comprises cylindrical cavities that open onto the tread surface, forming a circular opening surface having a diameter D equal to 5 mm. The cavities are distributed circumferentially at a circumferential spacing P equal to 25 mm and are positioned circumferentially along a periodic curve, of the broken-line type, having a period T equal to 145 mm and an amplitude A equal to 30 mm.

Compared with a reference tire having the same tread but without cavities in the shoulder ribs, the inventors have demonstrated, in tread separation tests following damage to the shoulder, that the mean length of the pieces of shoulder rib is divided by 3 compared with the reference tire and that the mean mass thereof is divided by 2.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for an airplane, comprising:
   a tread adapted to come into contact with the ground via a tread surface over a contact patch of circumferential length $L_C$ and axial width $L_A$ when the tire inflated to its recommended nominal pressure is subjected to a radial deflection equal to 32%;
   the tread extending radially from a bottom surface to the tread surface over a radial height H, extending axially from a first tread edge to a second tread edge, and extending circumferentially around the entire periphery of the tire;
   the tread comprising two axially external circumferential ribs referred to as shoulder ribs, each extending axially from a tread edge to a circumferential groove over an axial width $L_S$,
   wherein each shoulder rib comprises respective cavities that open onto the tread surface, each cavity forming an opening surface inscribed in a circle of diameter D, the cavities of each shoulder rib being distributed circumferentially at a circumferential spacing P, wherein all the cavities of each shoulder rib are positioned circumferentially along a respective periodic curve having a period T and an amplitude A, wherein the circumferential spacing P between two consecutive cavities is at most equal to 0.2 times the period T of the periodic curve, wherein the period T of the periodic curve is at most equal to the circumferential length $L_C$ of the contact patch and wherein the amplitude A of the periodic curve is at most equal to 0.5 times the axial width $L_S$ of the shoulder rib.

2. The tire according to claim 1, wherein the circumferential spacing P between two consecutive cavities is at least equal to twice the diameter D of the opening surface of a cavity.

3. The tire according to claim 1, wherein the diameter D of the opening surface of a cavity is at least equal to 2 mm.

4. The tire according to claim 1, wherein each cavity is a cylinder having a radial height $H_C$.

5. The tire according to claim 4, wherein the radial height $H_C$ of each cavity is at most equal to the radial height H of the tread.

6. The tire according to claim 1, wherein the periodic curve is a broken line.

7. The tire according to claim 1, the tread comprising at least one axially internal circumferential rib extending axially from a first circumferential groove to a second circumferential groove, wherein each shoulder rib comprises groove-edge cavities that open onto the tread surface and onto the circumferential groove adjacent to the shoulder rib, wherein the at least one axially internal circumferential rib comprises groove-edge cavities that open onto the tread surface and onto each of the circumferential grooves adjacent to the axially internal rib, wherein the groove-edge cavities formed in the shoulder ribs and in the at least one axially internal circumferential rib form mutually parallel rows of cavities that are inclined at an angle at least equal to 45° with respect to the circumferential direction of the tire, and wherein the rows of cavities are distributed circumferentially around at least a part of the periphery of the tire at a circumferential spacing P1 at least equal to 0.02 times and at most equal to 0.12 times the circumferential length of the periphery of the tire.

8. The tire according to claim 7, wherein the rows of cavities are inclined at an angle at least equal to 80° with respect to the circumferential direction.

9. The tire according to claim 1, wherein the diameter D of the opening surface of a cavity is at least equal to 5 mm.

* * * * *